Figure 1:
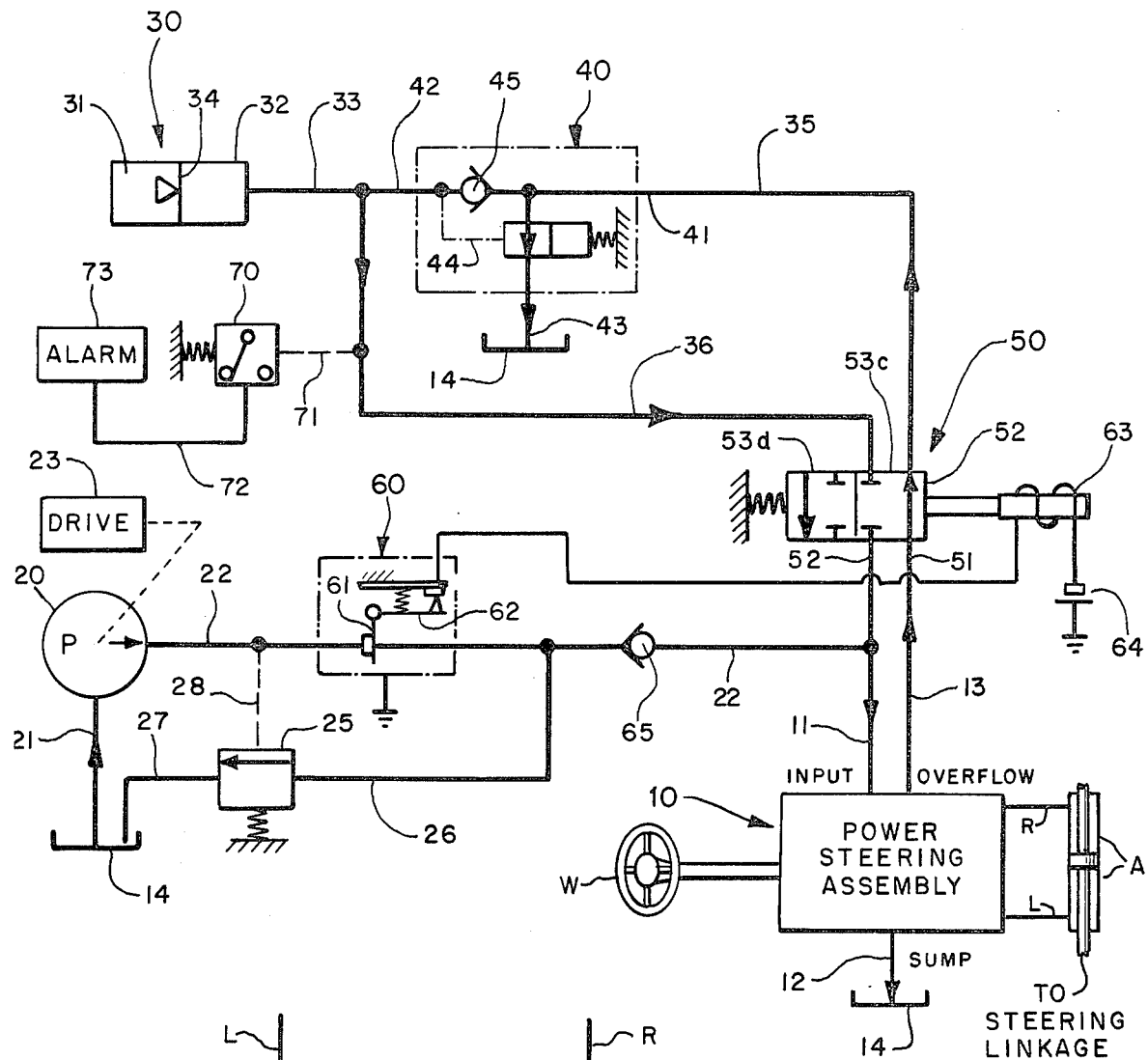

United States Patent [19]

Hanshaw

[11] Patent Number: 4,476,677
[45] Date of Patent: Oct. 16, 1984

[54] HYDRAULIC SUPPLY CIRCUIT FOR VEHICLE STEERING SYSTEM

[75] Inventor: Richard D. Hanshaw, Peoria, Ill.

[73] Assignee: Dresser Industries, Inc., Dallas, Tex.

[21] Appl. No.: 411,447

[22] Filed: Aug. 25, 1982

[51] Int. Cl.³ .................... B62D 5/08; F15B 20/00
[52] U.S. Cl. ................................. 60/328; 60/404;
  60/405; 60/413; 91/5; 180/133
[58] Field of Search ............ 60/328, 404, 405, 413,
  60/418, 582; 91/5, 28, 32, 33; 180/133

[56] References Cited

U.S. PATENT DOCUMENTS

| | | | |
|---|---|---|---|
| 3,905,438 | 9/1975 | Runyon et al. | 180/133 |
| 3,913,324 | 10/1975 | Miller et al. | 60/405 |
| 4,085,587 | 4/1978 | Garlinghouse | 60/404 X |
| 4,217,968 | 8/1980 | Dezelan | 60/404 X |
| 4,243,115 | 1/1981 | Wall et al. | 180/133 X |
| 4,326,558 | 4/1982 | Gage | 60/404 X |

Primary Examiner—Irwin C. Cohen
Attorney, Agent, or Firm—Leydig, Voit, Osann, Mayer & Holt, Ltd.

[57] ABSTRACT

An hydraulic supply circuit for a vehicle power steering system of the type having a steering actuator and control valve therefor with hydraulic input, sump and overflow (by-pass) connections and in which any fluid not actually consumed by the actuator is diverted to the overflow connection. A positive displacement pump is provided having an output line connected to the input connection of the steering system. An accumulator having a charging line and a discharging line is used to supply fluid pressure in lieu of the pump. To control flow of fluid to and from the accumulator a charge-discharge valve is provided having charge and discharge modes. In the charge mode the accumulator is charged by the overflow and in the discharge mode pressure fluid is supplied from the accumulator to the input connection for maintaining the steering system in operation while blocking the overflow. A flow sensing device in the output line of the pump is used to maintain the charge-discharge valve in its charge mode as long as fluid is pumped at normal rate by the pump but causing the charge-discharge valve to switch to its discharge mode upon any interruption of flow. A pressure switch is coupled to the accumulator discharge line for sounding an alarm to the vehicle operator whenever the pressure in the line drops thereby to signal that the steering system is receiving fluid from the accumulator on an emergency basis.

4 Claims, 2 Drawing Figures

U.S. Patent      Oct. 16, 1984      4,476,677

HYDRAULIC SUPPLY CIRCUIT FOR VEHICLE STEERING SYSTEM

This invention relates generally to steering systems for off-highway vehicles for example the large capacity trucks employed in open pit mining operations. Because of steering torque requirements it is necessry to employ an hydraulic servo system between the steering wheel in the cab and the vehicle wheels, the steering wheel operating a valve which feeds fluid to the hydraulic steering cylinders. It has further been known to employ an accumulator in the pressurized line and to provide isolation by a check valve adjacent the pump so that the vehicle might be steered to a safe stop upon failure of the pump.

One disadvantage of accumulator steering systems in common usage is that the system must continually over-pressurize above normal steering demands to maintain a fluid reserve in the accumulator for emergency steering. To overcome the disadvantages of a conventional accumulator arrangement, heavy duty power steering systems have become more sophisticated and hence expensive, an example of a more sophisticated system being shown in U.S. Pat. No. 3,905,438—Runyon et al. which issued Sept. 16, 1975.

It is an object of the present invention to provide an hydraulic supply circuit for a vehicle power steering system which is simple and inexpensive yet highly effective. It is a more specific object of the invention to provide an hydraulic supply circuit for a vehicle power steering system intended for use with heavy off-road vehicles but which has a high degree of safety and reliability enabling such vehicles, regardless of size, to be steered to a safe stop upon failure of the hydraulic pump or the pump drive.

It is a related object to provide an hydraulic supply circuit for an hydraulic steering system having normal overflow in which an accumulator is provided charged by the overflow but in which switching the accumulator into the supply circuit is accompanied by blocking of the overflow thereby to conserve, in maximum degree, the fluid in the accumulator.

It is another object of the invention to provide an hydraulic supply circuit including an accumulator in which the accumulator is pressurized by normal overflow of pressurized fluid from the power steering valve and actuator assembly without necessity for over-pressurizing. Because of the use of a continuously running pump operating at moderate pressure, the pump and associated components are distinguished by long and trouble-free operation.

Figure 2:
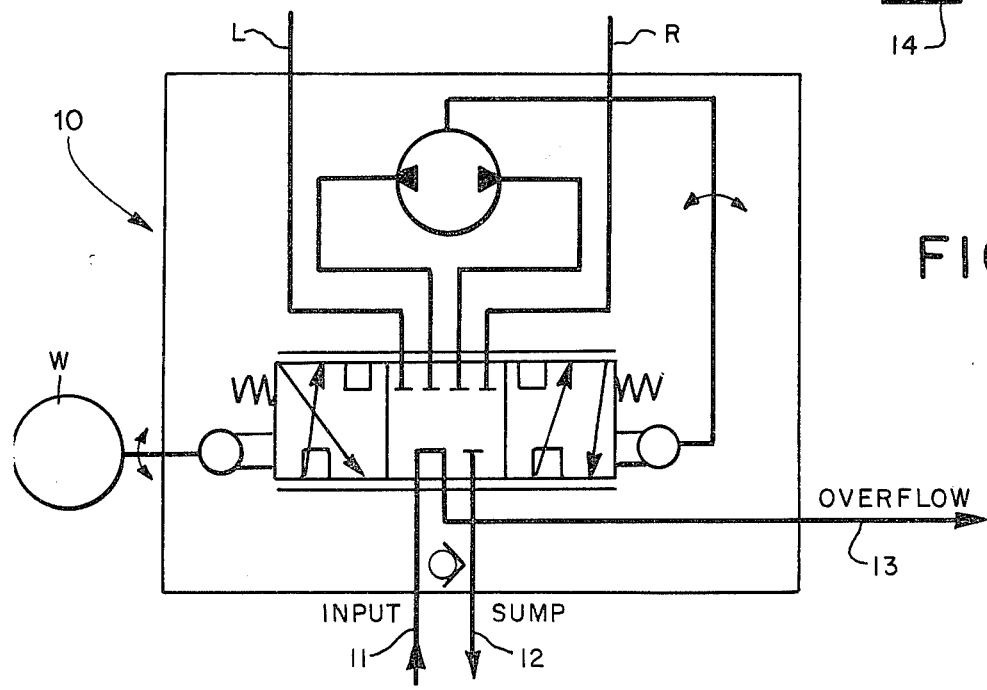

Other objects of the invention will become apparent upon reading the attached detailed description and upon reference to the drawing in which FIG. 1 shows schematically an hydraulic supply circuit constructed in accordance with the present invention and FIG. 2 shows schematically the power steering assembly of FIG. 1.

While the invention has been described in connection with a preferred embodiment, it will be understood that I do not intend to be limited to the particular embodiment shown but intend, on the contrary, to cover the various alternative and equivalent constructions included within the spirit and scope of the appended claims.

The purpose of the supply circuit is to provide pressurized fluid on a reliable basis to a power steering valve and actuator assembly 10 having an input connection 11, a sump connection 12 and an overflow connection 13. The sump connection 12 discharges into a sump or reservoir 14.

The power steering valve and actuator assembly 10 will be understood to be of the by-passed "closed center" type in which a valve operated by the steering wheel W has a central position in which flow is cut off to the actuators A associated with the steered wheels fed by lines R and L, blocking such wheels against any departure from the desired direction. When the steering wheel is turned, the actuator connections are uncovered admitting pressurized fluid to one end of the actuators permitting flow of pressurized fluid, and venting of the displaced fluid, causing the actuators to change the direction of the wheels by a desired amount. Any pressurized fluid entering at the input 11 and which is not consumed by the steering actuators is diverted, or by-passed, with full pressure, to the overflow connection 13. The vented fluid is discharged to the sump or reservoir 14 at atmospheric pressure. For further details of a typical steering assembly 10 to which the present invention is applicable, reference is made to Manual HGB-5-100 covering the Ross HYDRAGUIDE steering unit manufactured by the Ross Gear division of TRW Incorporated, LaFayette, Ind. 47902.

For the purpose of establishing pressurized flow a pump 20 is provided of the positive displacement type, for example a gear pump, having a sump connection 21 and an output line 22. The pump is powered by a drive 23 which may be a power take-off from the vehicle engine or which may be an electric driving motor. The output line 22 is connected to the input connection 11 of the power steering assembly 10. Effectively interposed in the pump output line is a relief valve 25 having an input connection 26, an output connection 27 and a control connection 28. The purpose of the relief valve is to protect the system against over-pressurization. Any increase in the pressure of the fluid in the control line 28 beyond a set level causes by-passing, or bleeding, of a portion of the output through the connections 26, 27 back into the sump so that the output pressure tends to be constantly maintained at an equilibrium level.

For storing fluid to meet an emergency condition an accumulator 30 is provided of the gas/oil type having a gas chamber 31 and an oil chamber 32 with a fluid connection 33, the two chambers being separated by a piston or diaphragm 34. The accumulator has a charging line 35 and a discharging line 36.

For the purpose of diverting fluid from the charging line to the sump when the accumulator has been charged to maximum rated pressure, an unloading valve 40 is provided having an input connection 41 and an output connection 42 as well as a sump connection 43 discharging into the sump 14. The unloading valve includes an internal control connection 44. Thus when the pressure at the output connection 42, transmitted by the internal connection 44, exceeds a predetermined level, pressurized fluid from the input is fully diverted into the sump so that no further flow occurs through the output connection 42 leading to the accumulator. A check valve 45 is interposed in the accumulator charging line for permitting flow in the charging direction but preventing flow of fluid in the reverse direction. The unloading valve 40 may, for example, be of the type disclosed in Bulletin 1418 of Kemp Industries of West Milford, N.J. 07480.

Interposed between the acumulator and the power steering assembly 10 is a charge-discharge valve 50 having a charge passageway 51 and a discharge passageway 52. The valve has a plunger 53 having a first section 53c for placing the valve in the charge mode and a second section 53d for placing the valve in the discharge mode.

The valve is shown in the charge mode in which the charge passageway 51, which is connected between the overflow connection 13 of the power steering assembly 10 and the accumulator charging line 35, is open, and the passageway 52 is closed off, thereby isolating the accumulator from the steering inlet connection 11. In the opposite, or discharge, mode the section 53d of the valve plunger is active, serving to open the discharge passageway 52 which is interposed between the accumulator discharging line 36 and the input connection 11 on the power steering assembly. Section 53d of the valve plunger also serves to close the charge passageway 51 thereby blocking off flow of fluid from the overflow connection 13 of the power steering assembly. The effect of this is to insure that all of the fluid arriving from the accumulator at the input connection 11 is used within the power steering assembly and is prevented from passing, as it normally would, through the overflow connection 13.

In accordance with the present invention means including a flow sensing device are provided in the output line of the pump for maintaining the charge-discharge valve in its charge mode as long as fluid is pumped at a normal rate by the pump but causing the charge-discharge valve to switch to its discharge mode for emergency steering upon interruption of the flow. Thus there is interposed in the pump output line 22 a contact making type of flow sensor indicated at 60 with a flow responsive element 61 and a set of contacts 62 which are closed as long as there is a substantial rate of flow. The contacts 62 control a solenoid 63 fed by a current source 64. The solenoid 63 is illustrated in its energized state in which the plunger 53 is thrust to the left to bring the first section 53c of the plunger into active position to establish the charging mode.

The operation under normal conditions with the pump 20 fully effective is as follows:

Rotated by the drive 23 the pump draws fluid through the sump or reservoir connection 21 discharging it under pressure into the output line 22 at a rate which is determined by the rate of rotation. The fluid flowing from the pump through the line 22 is sensed by the flow sensor 60, the contacts 62 therein closing to energize the solenoid 63 which shifts the valve plunger 53 to its illustrated position, establishing the accumulator charging mode.

Turning the steering wheel W to the right or left drives fluid into the corresponding wheel actuator to turn the wheels of the vehicle. Any fluid not required by the actuators flows constantly, and at full pressure, through the overflow connection 13, through the open charge passage 51 of the valve and into the accumulator charging line 35, the fluid passing through the check valve 45 and into the accumulator 30. Escape of the incoming fluid via the discharging line 36 is prevented by the fact that the line is blocked since the passage 52 which is connected to it is closed.

Thus the pressure in the accumulator builds up quickly to maximum rated system pressure. When this occurs, the unloading valve 40 responds by diverting the flow from the charging line 35 through the sump connection 43 to the sump 14. This places the accumulator in a charged condition of readiness. In the event that the pressure at the overflow connection 13, and hence in the line 35, should suffer a momentary dip the accumulator is isolated and any tendency toward reverse flow is prevented by the check valve 45 which is in series with the charging line.

Subsequent movements of the steering wheel cause fluid from the pump to be directed into the steering actuators on a constantly corrected basis.

However, it is always possible that there may be a failure of the pump 20, or of the drive 23, with the vehicle proceeding at speed. Any such failure, resulting in interruption of flow, is detected by the flow sensing device 60, opening the contact 62 therein. This de-energizes the solenoid 63 causing the portion 53d of the valve plunger to move into active position thereby establishing the accumulator discharge mode in which the passage 52 is open and the passage 51 is closed. Opening of the passage 52 permits fluid to flow from the accumulator through the discharge line 36 and into the input connection 11 on the power steering assembly thereby maintaining the steering system in operation Reverse flow of fluid from the accumulator into the pump output line 22 is prevented by providing a check valve 65 in such line.

It is to be especially noted that while opening of the passage 52 provides a connection from the discharging line 36 of the accumulator to the input connection 11 of the power steering assembly, the simultaneous closure of the passage 51 in the discharge mode blocks any overflow from the overflow connection 13. Thus the charge-discharge valve causes the power steering assembly 10 to operate differently in the two modes. In the normal, or charging, mode, with the pump fully effective, fluid overflows through the overflow connection 13, and such overflow is utilized in charging the accumulator. In such mode there is no need to conserve the pressurized fluid. However, in the accumulator discharge mode, with the overflow connection 13 blocked off, no fluid can escape from the power steering assembly except that which is vented by the steering actuator, or actuators, through the sump connection 12, and the pressurized fluid therefore is completely conserved to perform a useful steering function.

As a result of the above, pump or drive failure does not have the effect of disabling the steering system and the driver can steer to a safe stop.

For the purpose of alerting the driver to the fact that there has been a failure of the normal pressure fluid supply, a pressure switch is coupled to the output of the accumulator and connected to an alarm device. Such pressure switch has been diagrammatically illustrated at 70 having a pressure connection 71 and a normally open contact for energizing a line 72 leading to an alarm device 73 which may be in the form of an audible alarm or a bright signal light. The pressure switch is adjusted to respond whenever the pressure in the accumulator discharging line drops below maximum rated pressure thereby to signal to the operator that the steering system is receiving fluid from the accumulator on an emergency basis. This constitutes an instruction to the operator to immediately steer the vehicle to a safe stop. The accumulator contains sufficient pressurized fluid for emergency steering demands, at least two 45 degree turns or a single 90 degree turn to a safe position. Because of the conservation of fluid due to blocking the overflow, the accumulator may be quite compact.

It will be apparent from the above that the objects of the invention have been amply fulfilled. The hydraulic supply system discussed above not only avoids overpressurization above normal steering demands which characterizes the conventional system of this type but is simpler and more economical than sophisticated systems such as disclosed in the above-mentioned prior patent. The system is, notwithstanding its simplicity and economy, safe and reliable and capable of being used with the heaviest off-highway trucks and other vehicles.

One reason accounting for the economy of the system is that it may be constructed using a commercially available "off the shelf" steering assembly 10 and associated parts. Thus a standard gear pump suffices, a standard accumulator may be used, and both the relief valve 25 and unloading valve 40 are conventional. The charge-discharge valve 50 is the type of valve which is available at low cost and the flow detector switch 60 and pressure responsive switch 70 are commonly available. It will be understood that in lieu of the charge-discharge valve 50 two separate on-off valves operated by separate solenoids may be substituted, with alternative energization being provided by suitable normally open and normally closed contacts in the flow detector switch, a matter well within the skill of the art.

What I claim is:

1. In an hydraulic supply circuit for a vehicle power steering system of the type having a steering actuator and control valve therefor with hydraulic input, sump and overflow connections and in which any pressurized fluid not consumed by the actuator is diverted to the overflow connection, the combination comprising a positive displacement pump having a sump connection and an output line, a drive therefor, the output line being connected to the input connection of the steering system, a gas/oil accumulator having a charging line and a discharging line, an unloading valve in the charging line for diverting fluid from the charging line to the sump when the accumulator has been charged to maximum rated pressure, a charge-discharge valve having charge and discharge passages alternatively open in respective charge and discharge modes but otherwise closed, the charge passage being interposed between the overflow connection and the accumulator charging line so that in the charge mode the accumulator is charged by the overflow, the discharge passage being interposed between the accumulator discharge line and the input connection of the steering system so that in the discharge mode pressurized fluid is supplied from the accumulator to the input connection for maintaining the steering system in operation while the overflow connection is blocked, and means including a flow sensing device in the output line of the pump for maintaining the charge-discharge valve in its charge mode as long as fluid is pumped at normal rate by the pump but for causing the charge-discharge valve to switch to its discharge mode for emergency steering upon interruption of the flow.

2. The combination as claimed in claim 1 in which a check valve is interposed in the accumulator charging line for permitting flow in a charging direction but for preventing flow of fluid in the reverse direction upon a drop in pressure at the overflow connection when the charge-discharge valve is in its charge mode.

3. The combination as claimed in claim 1 in which a relief valve is connected to the output line of the pump for diverting fluid in the output line to the sump when the pressure in the output line exceeds a predetermined limit and in which a check valve is interposed in the output line for isolating the pump when the charge-discharge valve is in its discharge mode in which fluid is being supplied to the steering system by the accumulator.

4. The combination as claimed in claim 1 in which a pressure switch is coupled to the accumulator discharge line, the pressure switch being connected to an alarm device for sounding an alarm to the vehicle operator whenever the pressure in the accumulator discharging line drops below maximum rated pressure to signal to the operator that the steering system is receiving fluid from the accumulator on an emergency basis.

* * * * *